United States Patent [19]

Franks et al.

[11] Patent Number: 5,248,400
[45] Date of Patent: Sep. 28, 1993

[54] THERMOSETTING POWDER COATING COMPOSITIONS BASED ON POLYEPOXIDES AND ELASTOMER-MODIFIED PHENOLICS

[75] Inventors: James R. Franks, Allison Park, Pa.; Paul H. Pettit, Jr., Strongsville, Ohio

[73] Assignee: PPG Industries, Inc., Pittsburgh, Pa.

[21] Appl. No.: 858,467

[22] Filed: Mar. 27, 1992

[51] Int. Cl.$^5$ .............................................. C25D 13/00
[52] U.S. Cl. ................... 204/181.1; 204/181.6; 204/181.7; 427/410; 525/38; 525/109; 525/113; 525/934
[58] Field of Search ............... 204/181.1, 181.6, 181.7; 427/410; 525/934, 38, 109, 113

[56] References Cited

U.S. PATENT DOCUMENTS

| | | | |
|---|---|---|---|
| 3,966,837 | 6/1976 | Riew et al. | 525/109 |
| 4,220,675 | 9/1980 | Imazaki | 204/181.1 |
| 4,581,293 | 4/1986 | Saunders | 523/443 |
| 4,804,581 | 2/1989 | Geary et al. | 428/332 |
| 4,981,759 | 1/1991 | Nakatani et al. | 204/181.1 |
| 5,115,019 | 5/1992 | Marx et al. | 525/934 |

FOREIGN PATENT DOCUMENTS 440292  8/1991  European Pat. Off.

Primary Examiner—John Niebling
Assistant Examiner—Kishor Mayekar
Attorney, Agent, or Firm—William J. Uhl

[57] ABSTRACT

Thermosetting powder coating compositions and their method of application to substrates primed with an electrodeposited coating are disclosed. The powder coating composition comprises a solid particulated mixture of a polyepoxide and an elastomer-modified phenolic compound which is a reaction product of an epoxy resin, a functionalized elastomer and a phenolic compound. The use of the elastomer-modified phenolic composition permits the preparation of low viscosity, stable powder coating formulations for chip-resistant coatings.

7 Claims, No Drawings

THERMOSETTING POWDER COATING COMPOSITIONS BASED ON POLYEPOXIDES AND ELASTOMER-MODIFIED PHENOLICS

FIELD OF THE INVENTION

The invention relates to thermosetting powder coating compositions and to methods for coating substrates with the powder coating compositions. More particularly, the invention relates to thermosetting elastomer-modified powder coating compositions and to methods for coating substrates with these powder coating compositions.

BACKGROUND OF THE INVENTION

Powder coatings have the advantage of very low volatile organic content (VOC) and are being increasingly used in industry. One particular use is as a chipguard such as described in U.S. Pat. No. 4,804,581 in which a coating composition comprising an elastomer-modified epoxy resin and a carboxy functional material are disclosed. The elastomer-modified epoxy resin is derived from a polyepoxide and of from 5 to 35 percent of a functionally-terminated diene-containing polymer. Higher levels of elastomer modifier are reported to adversely affect stability and viscosity of the composition.

SUMMARY OF THE INVENTION

According to the invention, there are provided thermosetting powder coating compositions comprising a solid particulated mixture of:
1) a film-forming resinous binder comprising:
   a) a polyepoxide,
   b) elastomer-modified phenolic compositions having an average of at least 1.5 terminal hydroxyl groups per molecule and a phenolic equivalent weight of from 300 g to 2000 g which are obtainable by contacting in a reaction mixture:
      (i) an epoxy resin having on average more than 1 epoxy group per molecule,
      (ii) a functionalized elastomer comprising at least 1.5 functional groups which are reactive with epoxy or hydroxy groups, per molecule, and
      (iii) an equivalent excess with respect to (i) of a dihydric phenol;
2) additive ingredients selected from the class consisting of pigments, flow control agents, anti-oxidants, cure catalysts and degassing agents, including mixtures thereof.

Also provided by the invention is a method for coating a metal substrate with a chip-resistant coating comprising:
a) electrodepositing a primer layer on the surface of the metal substrate,
b) applying a thermosetting layer of the powder coating composition described immediately above over the previously applied electrodeposited primer layer,
c) either curing both layers simultaneously or curing the primer layer before application of the thermosetting layer and then curing the thermosetting layer.

DETAILED DESCRIPTION

The polyepoxide (i) used has a 1,2-epoxy equivalency greater than one and preferably of from two or more. The polyepoxide may be linear or branched, saturated or unsaturated, aliphatic, cycloaliphatic, aromatic or heterocyclic. Examples of polyepoxides suitable for use in the invention include polyglycidyl ethers of polyhydric compounds, epoxy novolacs or similar polyhydroxyphenol resins, polyglycidyl ethers of glycols or polyglycols, and polyglycidyl esters of polycarboxylic acids. Preferably the epoxy resin is a polyglycidyl ether of a polyhydric phenol. The preferred polyhydric phenol is bisphenol A.

Suitable functionalized elastomers (ii) are generally any elastomers functionalized at the end or middle portion of the elastomeric molecule. Suitable functional groups include, for example, carboxy, amino, hydroxyl, epoxy, mercaptan, anhydride and isocyanate. Functionally-terminated diene-containing polymers useful in modifying the phenolic compound (iii) and the epoxy resin (i) are preferably of the formula X—B—X wherein B is a polymer backbone polymerized from material selected from $C_4$ to $C_{10}$ dienes; a $C_4$ to $C_{10}$ diene and a vinyl aromatic monomer (e.g. styrene, an alkyl-substituted styrene, a halo-substituted styrene); a $C_4$ to $C_{10}$ diene and a vinyl nitrile (e.g., acrylonitrile or methacrylonitrile); a $C_4$ to $C_{10}$ diene, a vinyl nitrile and a vinyl aromatic monomer; or a $C_4$ to $C_{10}$ diene, a vinyl nitrile and an acrylate of the formula $CH_2=CR-COOR^1$ wherein R and $R^1$ are independently or both hydrogen or a $C_1$ to $C_{10}$ alkyl. X can be any functional group that can react with a phenolic hydroxyl or an oxirane. Suitable X include, for example, carboxyl, amino, hydroxyl, epoxy, mercaptan, anhydride and isocyanate groups.

Preferably the functionally-terminated diene-containing polymer is carboxyl-terminated polybutadiene, carboxyl-terminated poly(butadiene-acrylonitrile), carboxyl-terminated poly(butadiene-acrylonitrile-acrylic acid), with carboxyl-terminated poly(butadiene-acrylonitrile) (CTBN) being the most preferred.

Suitable elastomers (ii) functionalized at a middle portion include, for example, carboxylated polybutadiene, carboxylated poly(butadiene-styrene), mid-block carboxylated poly(styrene-ethylene/butadiene-styrene), amidated poly(butadiene-styrene), mercapto-polybutadiene, epoxidized polybutadiene and epoxidized poly(butadiene-styrene).

Commercial examples of suitable functionalized elastomeric polymers include HYCAR carboxyl-terminated liquid polymers manufactured by B. F. Goodrich and carboxylated KRATON thermoplastic elastomers manufactured by Shell Chemical Company.

The functionalized elastomer can be a hydrogenated polymer in which the backbone is hydrogenated. The elastomer can be a random, a block, a radical or a star copolymer.

The number average molecular weights of the functionalized elastomer lies preferably within the range of from 1,000 to 50,000.

The most preferred functionalized elastomer, the carboxyl-terminated butadiene-acrylonitrile copolymer, generally includes of from 0 to 30 weight percent acrylonitrile and of from 70 to 100 weight percent butadiene, preferably of from 10 to 26 weight percent acrylonitrile and of from 74 to 90 weight percent butadiene. In addition to the terminal carboxyl groups, other functional groups such as amino, phenolic, hydroxyl, epoxy, mercaptan or anhydride may be pendent on the chain. Typically, the functionality of the functionally-terminated diene-containing polymer has a value within the range of from 1.1 to 2.5, preferably within the range of from 1.8 to 2.3. Generally, carboxyl-terminated butadiene-acrylonitrile copolymers have number average molecular weights in the range of from 3,000 to 5,000, preferably in the range of from 3,200 to 4,300. Commercial examples of such polymers include those available from B. F. Goodrich under the trade mark HYCAR.

Preferably the elastomer-modified phenolic composition of the invention comprises of from 5 to 35 weight percent, based on the total weight of compounds (i)+(ii)+(iii) of a functionalized elastomer (ii).

Suitable phenolic compounds (iii) are polyhydric phenols, including dihydric phenols having two hydroxyl groups attached to an aromatic or polyaromatic nucleus, such as, for example, resorcinol, catechol, 2,2-bis(4-hydroxyphenyl)propane (bisphenol A), 4,4'-sulfonyldiphenol and dihydroxy diphenyl methane. Preferred dihydric phenols are bis(hydroxyphenyl)alkanes, 2,2-bis(4-hydroxyphenyl)propane being most preferred.

The elastomer-modified phenolic composition is generally prepared by reacting a polyepoxide (i) with a functionalized elastomer (ii) and an equivalent excess, with respect to the polyepoxide (i) of a polyhydric phenol (iii) in order to obtain a product having terminal hydroxyl groups and a phenolic equivalent weight of from 300 g to 2000 g, preferably of from 400 g to 1000 g. Preferably the elastomer-modified phenolic composition is prepared by reacting a stoichiometric excess of a dihydric phenol with a linear diepoxy resin in the presence of a catalyst as described in U.S. Pat. No. 4,767,832. The functionalized elastomer, diepoxy resin and the dihydric phenol can be added to a reactor concurrently and reacted together or in sequence and reacted stepwise, so long as the objective of an elastomer-modified phenolic composition having an average of at least 1.5 terminal reactive phenolic hydroxyl groups is achieved. The amount of the phenolic compound in the mixture will generally be of from 1 to 4, preferably of from 1.5 to 2, equivalents per equivalent of the polyepoxide (i), in order to obtain the desired molecular weight range.

When the functionalized elastomer (ii) is added in the absence of the polyepoxide (i), an equivalent excess of dihydric phenol (iii) may be subsequently added in order to obtain the desired phenolic equivalent weight for the elastomer-modified phenolic composition.

The modification of the phenolic compound with the functionalized elastomer is generally conducted at a temperature within the range of from 40° C. to 200° C., preferably within the range of from 140° C. to 190° C., for a reaction time of from 0.5 to 5 hours in order to achieve essentially complete consumption of the epoxy groups. A catalyst for the modification is added to the reaction mixture in amounts of from 0.01 to 1.0 percent by weight. Suitable catalysts include tertiary amine catalysts such as tributylamine, quaternary ammonium salts such as tetrabutylammonium chloride, tertiary phosphates such as triphenylphosphate, quaternary phosphonium salts such as ethyltriphenyl phosphonium iodide, metal salts such as AMC-2 (a chromium octoate salt), and combinations of catalysts in staged reactions, with the quaternary phosphonium salts such as ethyltriphenyl phosphonium iodide (ETPPI) being preferred. In general the reaction product of the phenolic compound (iii), polyepoxide (i) and the functionalized elastomer (ii) upon cooling is a friable solid.

Polyepoxides (a) suitable for use with elastomer-modified phenolic compositions (b) in thermosetting powder coating applications can be in general any of the polyepoxides (i) mentioned above. Liquid epoxy resins may be used provided that they are advanced to a solid state with, for example, bisphenol A. The epoxy resin (i) generally has an EEW in the range of from 500 to 2000 and an average molecular weight in the range of from 1000 to 3500. Epoxy resins having higher EEW's and molecular weights may be used, provided that the resin is processable in the intended use, for example, in an extruder or melt compounder.

If desired in a particular formulation, the polyepoxide resin can be modified with a functionalized elastomer as described above in which the functional groups are reactive with epoxy groups preferably in an amount of from 1 to 20 percent weight based on the weight of polyepoxide and functional elastomer. Such modification is described in U.S. Pat. No. 4,804,581, col. 4, line 47 to col. 5, line 11. The reaction product of the epoxy resin (i) and the functionalized elastomer (b) upon cooling is a friable solid having an EEW in the range of from 500 to 3,000, preferably in the range of from 700 to 2,500.

In the thermosetting powder coating compositions of the invention, the ratio, in equivalents, of the polyepoxide (a) to the phenolic component (b) is generally within the range of from 0.7:1 to 1:0.7, preferably within the range of from 1:0.8 to 1:1.

The film-forming resinous binder may comprise other curing agents such as polyamines, carboxy functional polyesters, polycarboxylic acids and other phenolics and preferably in solid particulated form. The film-forming resinous binder is present in amounts of 70 to 95, preferably 80 to 88 percent by weight based on total weight of (1) film-forming resinous binder and (2) additive ingredients described below.

The thermosetting powder coating compositions contain formulation ingredients normally found in thermosetting powder coating compositions including pigments, fillers, organic flow control agents, antioxidants, cure catalysts and degassing agents. The formulation ingredients are present in amounts of 5 to 30, preferably 12 to 20 percent by weight based on total weight of (1) film-forming resinous binder and (2) additive ingredients.

Pigment can be included in the coating composition in amounts of up to about 16, preferably 1.0 to 10 percent by weight based on total weight of (1) and (2) in order to give a suitable color to the resultant coating. Suitable pigments for the elastomer-modified epoxy-containing coating compositions include, e.g., titanium dioxide, barium sulfate, ultramarine blue, phthalocyanine blue, phthalocyanine green, carbon black, black iron oxide, chromium green oxide, ferrite yellow or quindo red. In embodiments of the present invention wherein the thermosetting powder coating layer is beneath at least one layer of a topcoat layer, such pigment additives may be excluded and pigments may instead be incorporated into a topcoat layer.

Suitable organic flow control agents are lower molecular weight acrylic polymers, i.e., acrylic polymers, i.e., acrylic polymers having a number average molecular weight from about 1000 to 50,000, such as polylauryl acrylate, polybutyl acrylate, poly(2-ethylhexyl)acrylate, poly(ethylacrylate-2-ethylhexylacrylate), polylauryl methacrylate and polyisodecyl methacrylate, and fluorinated polymers such as the esters of polyethylene glycol or polypropylene glycol and fluorinated fatty acids. Polymeric siloxanes of molecular weights over 1000 may also be used as a flow control agent, for example, poly(dimethylsiloxane) or poly(methylphenyl) siloxane. Flow control agents can aid in the reduction of surface tension during heating of the coating powder and in elimination of crater formation. Generally, the flow control agent when used is present in amounts of from about 0.05 to 5.0 percent by weight based on total weight of (1) and (2).

Anti-popping or anti-gassing agents can be added to the composition to allow any volatile material present to escape from the film during baking. Benzoin is a commonly preferred anti-popping agent and when used is present in amounts from about 0.5 to 3.0 percent by weight based on total weight of (1) and (2).

In addition, powder coating compositions may contain the filler fumed silica as a powder fluidizing additive to reduce powder caking during storage. An example of fumed silica is sold by Cabot Corporation under the trademark CAB-O-SIL. The powder fluidizing additive when used is present in amounts ranging from about 0.1 to about 1.0 percent by weight based on the total weight of a powder coating composition. The powder fluidizing additive is generally added to a particulate powder coating composition after preparation of the particulate mixture.

The thermosetting powder coating compositions utilized in accordance with the present invention may include a small percentage of catalyst in order to increase the crosslinking rate of such coating compositions. Baking temperatures will ordinarily be within the range of about 120° C. to 177° C. (250° F. to 350° F.). Suitable catalysts are quaternary ammonium salts, quaternary phosphonium salts, phosphine, imidazoles and metal salts. Examples include tetrabutylammonium chloride, tetrabutylammonium bromide or tetrabutylammonium iodide, ethyltriphenyl phosphonium acetate, triphenylphosphine, 2-methyl imidazole and dibutyltin dilaurate. The catalyst, when used, is preferably present in the composition in amounts of between 0.1 and about 5 percent by weight, preferably from about 0.2 to 2 percent by weight based on total weight of (1) and (2).

Anti-oxidants such as IRGANOX-1076 can be incorporated into the thermosetting powder coating composition in amounts of 0.1 to 5.0, preferably 1.0 to 2.0 percent by weight based on total weight of (1) and (2).

The thermosetting powder coating compositions can be prepared by melt blending the ingredients of the coating compositions. This can be accomplished by first dry blending the ingredients in a planetary mixer and then melt blending the admixture in an extruder at a suitable temperature within the range of from 80° C. to 130° C. The extrudate is then cooled and pulverized into a particulate blend.

The thermosetting powder coating composition can then be applied directly to a substrate of, e.g., a metal such as steel or aluminum. Non-metallic substrates such as plastics and composites can also be used. Application can be by electrostatic spraying or by use of a fluidized bed. Electrostatic spraying is the preferred method. The coating powder can be applied in a single sweep or in several passes to provide a film thickness after cure of from 2 to 15 mils.

The substrate can optionally be preheated prior to application of a powder coating composition to promote uniform and thicker powder deposition. After application of the coating powder, the powder-coated substrate is baked typically at 121° C. to 204° C. for from 1 minute to 60 minutes, preferably at 149° C. to 177° C. for from 10 minutes to 30 minutes.

The powder coating compositions can be applied directly upon bare metal. e.g., upon untreated, unprimed steel, or upon pretreated, i.e., phosphatized, unprimed steel. The powder coating compositions can also be applied upon phosphatized steel having a thin (1.0 to 2.0 mil) layer of an electrodeposited primer, cured or uncured before the application of the powder coating composition. The electrodeposited primer coating upon the metal substrate can be, for example, a cathodic electrodeposition primer composition such as those available from PPG Industries, Inc. under the trademark UNI-PRIME. In one aspect of the present invention, it is contemplated that the powder coating composition can be applied directly upon an uncured electrodeposited primer coating and the powder coating layer can be co-cured by heating at temperatures between 149° C. and 177° C. for from 10 minutes to 30 minutes.

The powder coating compositions of this invention exhibit improved flow characteristics compared to conventional powder coating compositions in which the elastomer modifier is incorporated in the epoxy component only. In addition, the powder coating compositions of the invention have excellent stability and impact resistance.

After application and curing of the elastomer-modified powder coating composition, at least one topcoat layer is applied over the coating layer. The topcoat can be, for example, a polyester-based coating cured with an aminoplast resin, an acrylic polymer-based coating cured with an aminoplast resin, a mixed resinous blend of an acrylic polymer and polyester containing coating cured with an aminoplast resin. The topcoat may be solvent-based, water-based or a powder coating. The topcoat layer may be a composite coating comprising a colored or pigmented basecoat over which is deposited a transparent or clear coat. The elastomer-modified powder coating layers have excellent intercoat adhesion to such topcoats, as well as to an electrodeposited primer coating layer, thereby providing excellent chip resistance to the entire composite coating upon the metal substrate.

The invention composition can be used in automotive applications to provide desired anti-chip protection. For example, an automotive coating including an electrodeposited primer layer, a layer containing the curable powder coating composition of the invention, and a topcoat layer can be used on those portions of a car susceptible to stone chipping. Similarly, a coating including an electrodeposited primer layer and a layer containing the curable elastomer-modified powder coating composition can be used as underbody coatings in areas which are generally not topcoated. The coated articles of the present invention have excellent chip resistance, corrosion resistance, and excellent intercoat adhesion throughout the temperature range, i.e., of from −23° C. to 38° C., and corrosive environments normally encountered by automotive vehicles.

The following examples show the preparation of an elastomer-modified phenolic resin; the preparation of a thermosetting powder coating composition with the elastomer-modified phenolic resin and a polyepoxide and the application of the powder coating composition to a cured and uncured electrodeposited layer which had been previously applied to a zinc phosphate steel panel. In the case of the uncured electrodeposited layer, the powder coating layer and electrodeposited layer were cured simultaneously.

EXAMPLES

Example A

Elastomer-modified phenolic resin.

| Ingredient | Parts by Weight |
| --- | --- |
| EPON 828[1] | 41.18 |
| Bisphenol A | 38.79 |
| CTBN[2] | 19.99 |
| Ethyltriphenylphosphonium iodide | 0.04 |

[1]Diglycidyl ether of bisphenol A having an epoxide equivalent weight of 188 available from Shell Chemical Co.
[2]Carboxyl terminated copolymer of butadiene and acrylonitrile having a number average molecular weight of 3600 and a carboxyl functionality of 1.8 to 2.0 available from B. F. Goodrich Co. as HYCAR 1300 X8.

The ingredients were mixed in a suitable reaction vessel under nitrogen atmosphere with the reaction mixture being gradually heated to 130° C., whereupon the mixture exhibited an exotherm. A peak exotherm of about 180° C. was reached. The mixture was held at this temperature until no epoxy functionality was detected.

Example 1

A pigmented thermosetting powder coating composition was prepared from the following ingredients:

| Ingredient | Parts by Weight |
| --- | --- |
| EPON 2002[1] | 48.57 |
| Elastomer-modified phenolic resin (Ex. A) | 38.07 |
| Catalyst[2] | 0.43 |
| Flow additive[3] | 1.80 |
| Antioxidant[4] | 1.80 |
| Benzoin | 0.60 |
| Titanium dioxide | 8.70 |
| Carbon black | 0.03 |

[1]Polyglycidyl ether of bisphenol A having an epoxy equivalent weight of 700.
[2]P-101 available from Shell Chemical Co.
[3]Maleic anhydride/1-decene copolymer $M_n$ = 3000 modified with 2-ethanolamine; $M_n$ = 3000, OH value = 140. See European Patent 307,623 in which 2 mole percent of the hydroxyl groups are reacted with octadecyl isocyanate.
[4]IRGANOX-1076 available from Ciba-Geigy Corp.

The ingredients were blended in a planetary mixer for about 2 to 3 minutes, then melt blended through a twin-screw extruder at 110° C., broken into chunks and ground in a micromill to a fine powder. The powder then was sieved through a 140-mesh screen to remove particles larger than 100 microns.

The resulting thermosetting powder coating was then sprayed electrostatically onto electrogalvanized zinc phosphated pretreated steel panels having a layer of uncured/dehydrated [250° F. (121° C.) for 5 minutes] electrodeposition coating (PPG UNI-PRIME ED-3150), whereupon both the electrodeposited layer and the powder coating layer are co-cured at 171° C.

The resulting powder coating layer ranged in thickness from 2 to 10 mils. A topcoat including an acrylic/melamine basecoat layer (HUBC-9225 from PPG Industries, Inc.) about 0.6 to 0.8 mils thick and an acrylic/melamine clearcoat layer (DCT-1000 from PPG Industries, Inc.) of about 1.8 to 2.0 mils thick were applied wet on wet over the cured powder coating. The cure of the topcoats was 250° F. (121° C.) for 30 minutes. The properties of the cured composite coatings are given in Table I below.

TABLE I

| Powder Coating Film Thickness (in mils) | Chip Rating[1] | Cold-Crack Cycle Test[2] |
| --- | --- | --- |
| 2.5 | 8 | pass |
| 4.5 | 8 | pass |
| 6. | 10 | pass |
| 8. | 10 | pass |
| 10.5 | 10 | pass |

[1]Chip resistance was determined by firing five pints of small gravel stones under about 60 to 70 psi at 90° incident angle onto coated panels which had been chilled for two hours at −10° F. (−23° C.). The test was conducted in a Gravelometer supplied by the Q-Panel Company. The panels were then rated visually on a scale of 1-10 with the larger number indicating less chipping of the coating.
[2]Panels which had been subjected to the Gravelometer testing were passed through 15 cycles of the following sequence of conditions: 24 hours at 100% relative humidity at 100° F. (38° C.), 20 hours at −10° F. (−23° C.) and 4 hours at room temperature, i.e., about 70° F. (21° C.). The panels were then examined for the presence of cracks with a pass rating given for no crack.

We claim:

1. A method for coating a metal substrate with a chip-resistant coating comprising:
   (a) electrodepositing a primer layer on a surface of the metal substrate,
   (b) applying a layer of a thermosetting powder coating composition onto the previously applied electrodeposited primer layer, and
   (c) either co-curing both layers simultaneously or curing the primer layer before application of the layer of the thermosetting powder coating composition and then curing the layer of the thermosetting powder coating composition, said thermosetting powder coating composition comprising a solid particulate mixture of:
      (1) a film-forming resinous binder comprising:
         (a) a polyepoxide
         (b) an elastomer-modified phenolic composition having an average of at least 1.5 terminal hydroxyl groups per molecule and a phenolic equivalent of from 300 g to 2000 g which is obtainable by co-reacting in a reaction mixture:
            (i) an epoxy resin having an average of more than one epoxy group per molecule,
            (ii) a functionalized elastomer comprising at least 1.5 functional groups per molecule which are reactive with epoxy or hydroxyl groups, and
            (iii) an equivalent excess with respect to (i) of a dihydric phenol.

2. The method of claim 1 wherein the thermosetting layer is from 2 to 15 mils thick.

3. The method of claim 1 wherein the amount of (ii) is 5 to 35 percent by weight based on total weight of (i), (ii) and (iii).

4. The method of claim 1 wherein (ii) is an end group functionalized elastomer X—B—X wherein B is a polymer backbone polymerized from a material selected from the group consisting of a $C_4$ to $C_{10}$ diene; a $C_4$ to $C_{10}$ diene and a vinyl aromatic monomer; a $C_4$ to $C_{10}$ diene and a vinyl nitrile; a $C_4$ to $C_{10}$ diene and a vinyl nitrile and a vinyl aromatic monomer; a $C_4$ to $C_{10}$ diene and a vinyl nitrile and an alkyl (meth)acrylate; and X is selected from the group consisting of carboxy, amino, hydroxyl, epoxy, mercaptan, anhydride and isocyanate groups.

5. The method of claim 1 wherein (ii) is a carboxyl acid-terminated poly(butadiene-acrylonitrile).

6. The method of claim 1 wherein (iii) is bisphenol A.

7. The method of claim 1 wherein the ratio in equivalence of polyepoxide (a) to elastomer-modified phenolic composition (b) is in the range of 0.7:1 to 1:0.7 and is sufficient to form a cured layer of the powder coating composition.

* * * * *